(12) United States Patent
Santoro et al.

(10) Patent No.: US 11,389,754 B2
(45) Date of Patent: Jul. 19, 2022

(54) CONTROLLING A SEPARATION DEVICE

(71) Applicant: SALSNES FILTER AS, London (CA)

(72) Inventors: Domenico Santoro, London (CA); Alessandro Franchi, Fountain Valley, CA (US); Siva Rajan Sarathy, London (CA); Farnaz Daynouri-Pancino, London (CA)

(73) Assignee: U.S. Peroxide, LLC, Atlanta, GA (US)

( * ) Notice: Subject to any disclaimer, the term of this patent is extended or adjusted under 35 U.S.C. 154(b) by 169 days.

(21) Appl. No.: 15/772,474

(22) PCT Filed: Oct. 31, 2016

(86) PCT No.: PCT/CA2016/051257
§ 371 (c)(1),
(2) Date: Apr. 30, 2018

(87) PCT Pub. No.: WO2017/070792
PCT Pub. Date: May 4, 2017

(65) Prior Publication Data
US 2018/0318736 A1    Nov. 8, 2018

Related U.S. Application Data

(60) Provisional application No. 62/248,087, filed on Oct. 29, 2015.

(51) Int. Cl.
*C02F 1/00*      (2006.01)
*C02F 11/123*    (2019.01)
(Continued)

(52) U.S. Cl.
CPC .......... *B01D 33/048* (2013.01); *B01D 33/37* (2013.01); *B01D 33/41* (2013.01); *B01D 33/806* (2013.01);
(Continued)

(58) Field of Classification Search
CPC combination set(s) only.
See application file for complete search history.

(56) References Cited

U.S. PATENT DOCUMENTS 3,774,760 A * 11/1973 Beristain ................ B01D 33/04
                                                    210/770
4,168,236 A *  9/1979 Bahr ...................... B01D 33/03
                                                    210/294

(Continued)

FOREIGN PATENT DOCUMENTS

| CA | 2135537    | 1/2001 |
|----|------------|--------|
| JP | 2017136201 | 7/2014 |
| WO | 96/25993   | 8/1996 |

OTHER PUBLICATIONS

European Patent Office, Supplementary European Search Report, dated Jun. 19, 2018, pp. 3.

(Continued)

*Primary Examiner* — Hayden Brewster
(74) *Attorney, Agent, or Firm* — Ference & Associates LLC

(57) ABSTRACT

There is described a system and a process for optimizing and controlling upstream fluid treatment processes using information on fluid characteristics obtained from response variables of a separation device (such as the belt speed or water level of an RBF). This system and process allow for the upstream or downstream treatment processes to be adjusted and optimized against the instantaneous operating conditions of the separation device such that both the pre-treatment and post-treatment processes and the separation system always run at an optimal efficiency. Additionally, since the information obtained from the response variables of the separation device truly reflect the fluid characteristics at the point where the separation system is installed, the same can be used to control a downstream process (for (Continued)

Detail view of the continuous belt arrangement in a RBF example, the amount of oxygen required in the biological oxidation stage or the sludge retention time in an side stream sludge treatment process such as fermentation or anaerobic digestion).

6 Claims, 5 Drawing Sheets

(51) Int. Cl.
    *B01D 33/80*      (2006.01)
    *B01D 33/048*      (2006.01)
    *C02F 11/147*      (2019.01)
    *B01D 33/37*      (2006.01)
    *B01D 33/41*      (2006.01)

(52) U.S. Cl.
    CPC ............ *B01D 33/808* (2013.01); *C02F 1/004* (2013.01); *C02F 1/008* (2013.01); *C02F 11/123* (2013.01); *C02F 11/147* (2019.01); *C02F 2209/005* (2013.01); *C02F 2209/03* (2013.01); *Y02W 10/40* (2015.05)

(56) References Cited

U.S. PATENT DOCUMENTS

| | | | |
|---|---|---|---|
| 4,867,886 A | | 9/1989 | Botkins et al. |
| 5,133,872 A | * | 7/1992 | Baldwin ............... B01D 33/042 210/105 |
| 5,846,433 A | * | 12/1998 | Sorensen ................ C02F 1/56 210/709 |
| 6,872,312 B1 | * | 3/2005 | Shah ..................... C02F 3/1273 210/609 |
| 2013/0233778 A1 | * | 9/2013 | Moss ................... B01D 33/056 210/91 |
| 2015/0006034 A1 | | 3/2015 | Mitchel |
| 2015/0068981 A1 | * | 3/2015 | Ormeci Beckers ... C02F 1/5209 210/709 |

OTHER PUBLICATIONS

International Searching Authority, Written Opinion of the International Searching Authority, dated Mar. 31, 2017, pp. 10.
Chakraborty , "Evaluation of Filtration Performance of a Rotating Belt Filter for Different Primary Wastewater Influents", 2015). Electronic Thesis and Dissertation Repository. Paper 3165. [online] [retrieved on Feb. 13, 2017 (Feb. 13, 2017)]. Retrieved from the Internet: at http:/ /ir.lib. uwo.ca/cgi/viewcontent.cgi?article=47 49&context=etd See p. 18.
Ebeling , et al., "Performance evaluation of an inclined belt filter using coagulation/flocculation aids for the removal of suspended solids and phosphorus from microscreen backwash effluent", Aquacultural Engineering, 2006, vol. 35, pp. 61-77, [online] [retrieved on Feb. 13, 2017 (Feb. 13, 2017)]. Retrieved from the Internet: www.sciencedirect.com. doi 10.1016/j.aquaeng.2005.08.006, 61-77.
Johnson , et al., "Optimizing belt filter press dewatering at the skinner filtration plant", AWW A, Nov. 1992, [online] [retrieved on Feb. 13, 2017 (Feb. 13, 2017)]. Retrieved from the Internet.
A Franchi et al., "Current status of the rotating belt filtration (RBF) technology for municipal wastewater treatment", Water Practice and Technology, Jun. 1, 2015, 9 pages, vol. 10, No. 2, XP055604853, ISSN: 1751-231X, DOI: 10.2166/wpt.2015.038.
European Patent Office, Communication pursuant to Article 94(3) EPC, dated Sep. 16, 2019, 5 pages, European Patent Office.

* cited by examiner

CONTROLLING A SEPARATION DEVICE

CROSS-REFERENCE TO RELATED APPLICATION

The present application is a National Phase Entry of PCT International Application No. PCT/CA2016/051257, which was filed on Oct. 31, 2016, and claims the benefit under 35 U.S.C. § 119(e) of provisional patent application Ser. No. 62/248,087, filed Oct. 29, 2015, the contents of which are hereby incorporated by reference.

BACKGROUND OF THE INVENTION

Field of the Invention

The present invention relates to the optimization of a fluid treatment process by integrating the response variables of a separation system with the control logic for the fluid treatment process. Thus, in one of its aspects, the present invention relates to a process to optimize the dose of at least one treatment agent required to modify properties of a fluid being treated in a separation device. In another of its aspects, the present invention relates to a process to optimize both a dose of at least one treatment agent required to modify properties of a fluid being treated in a separation device and a hydraulic retention time of the separation device. In another of its aspects, the present invention relates to a system for modulating the dose of at least one treatment agent required to modify the properties of a fluid to optimize the performance of a separation process. In yet another of its aspects, the present invention relates to a system for adjusting the dose range of a treatment agent required to modify the properties of a fluid to optimize the performance of a separation device the system. In yet another of its aspects, the present invention relates to a system for adjusting the dose range of a treatment agent required to modify the properties of a fluid, and the hydraulic retention time of a separation system to optimize the performance of a separation device. In yet another of its aspects, the present invention relates to a system for adjusting the operation parameters of a pretreatment or post treatment system based on the operational parameters of a separation device.

DESCRIPTION OF THE PRIOR ART

An endless or rotating belt filter (RBF) is a device used to remove particulate from a fluid. These types of filters generally consist of a vessel or concrete structure containing an endless filter belt that moves around two or more fixed (pivotal) points. The belt is sealed to the walls of the vessel to define an inlet side and an effluent side. The belt is generally inclined and rises out of the influent side of the filter where particulate is removed.

As the fluid flows through the inclined section of a RBF, solids are filtered through mesh. The maximum fluid level upstream the filter is dictated by the system head losses as well as by an overflow weir located on the upstream side of the belt to prevent flooding of the RBF if the hydraulic capacity is exceeded. On the effluent side of the belt, the filtered fluid is then conveyed to an outlet pipe. A seal system prevents the carryover of particulates into the filtered effluent. Overall, the RBF filtration process can be described as a balance of two phenomena: sieving and cake filtration. The rotating belt screen is cleaned at the end of every filtration cycle (defined as the sequence of processes, i.e. sieving, cake formation and gravity thickening on the belt, occurring between cleaning events) so that at the start of every new cycle the filtering mesh is clean.

Initially, when the belt is clean, solids are removed by sieving. As solids are accumulated on the mesh they create 'filter mat' that enhances filtration performance by means of cake filtration mechanism. In cake filtration, particulate smaller than the belt mesh size are removed since the filter pore size is dominated by the cake structure instead of the mesh size. Filtered solids accumulated on the mesh are conveyed to the upper portion of the belt and then dropped in a collection trough. A dedicated system (options include air knife, water or mechanical) continuously cleans the filter mesh and dislodges any remaining solids as the belt rotates. The mesh can also be backwashed as needed with hot water to remove oil and grease accumulation. Sludge collected in the trough is conveyed to one end of the collection trough by means of an auger. Depending on application requirements, sludge can be further processed through a compression and de-watering section or conveyed to a sludge stabilization process (e.g. anaerobic digestion) or appropriately disposed.

The main variables controlling filter performance are the fluid characteristics, flow rate, the type of belt, the characteristics of the solids to be removed, the system head losses (i.e., the energy available for the filtration process to occur), and the speed of the belt. Currently, RBFs are equipped with a control mechanism based on the level of water to be treated. Using this control, the filter can be operated in the following modes:

1. Optimization for maximum hydraulic performance. In this case the belt rotation is adjusted until a target flow rate is met.
2. Optimization for solids removal. In this case, the belt rotation is adjusted until a target solids removal rate is met. Under such control strategy, hydraulic performance is not an objective and filter flowrate becomes the uncontrolled variable.
3. Hybrid control logics based on combinations of points "a" and "b"
4. A final option for RBF performance optimization is based on the control of the fluid characteristics (i.e., particle size distribution, particle number, floc strength, etc.) by pre-treating the fluids with chemical, physical and biological agents. For instance, coagulation and flocculation agents can be added upstream the RBF to induce particle agglomeration and particle strengthening thus facilitating their removal by a filter belt of a specified pore size. However, in order to optimize such pre-treatment step, information around the fluid characteristics is needed such as (a) when to pre-treat the fluid and (b) what is are optimal pre-treatment agents and doses to be used to meet the desired treatment objective.

Pre-treatment agents add cost to the process and it is desirable to manage the dosing of these agents to optimize filtration while controlling cost. Conventionally, pre-treatment agents are added either at a consistent rate or paced against signals from sensors measuring variables external or extrinsic to the operational parameters of the RBF system such as treated flowrate or effluent turbidity.

It would be useful to have a system and a process which obviate and/or mitigate at least one of the above described disadvantages of the prior art.

SUMMARY OF THE INVENTION

It is an object of the present invention to obviate or mitigate at least one of the above-mentioned disadvantages of the prior art.

It is another object of the present invention to provide a novel process for process for optimizing a dose of at least one treatment agent required to modify properties of a fluid being treated in a separation device.

It is another object of the present invention to provide a novel process to optimize both a dose of at least one treatment agent required to modify properties of a fluid being treated in a separation device and a hydraulic retention time of the separation device.

It is another object of the present invention to provide a novel system for adjusting the dose range of a treatment agent required to modify the properties of a fluid to optimize the performance of a separation device.

It is another object of the present invention to provide a novel system for adjusting the dose range of a treatment agent required to modify the properties of a fluid to optimize the performance of a separation device.

It is another object of the present invention to provide a novel system for adjusting at least one operational parameter of a pretreatment or post-treatment system based on at least one operational parameters of a separation device.

It is another object of the present invention to provide a novel system for modulate a dose range of a treatment agent required to modify properties of a fluid of a separation system and to modulate a hydraulic retention time of the separation system to optimize the performance of the separation device.

Accordingly, in one of its aspects, the present invention provides a process for optimizing a dose of at least one treatment agent required to modify properties of a fluid being treated in a separation device, the process comprising the steps of:

(a) measuring at least one operational parameter of the separation device to obtain at least one measured operational parameter;

(b) determining an optimal dose for the at least one treatment agent based on the at least one more measured operational parameter to obtain a determined optimal dose; and (c) adjusting the dose of the at least one treatment agent to the determined optimal dose.

In another of its aspects, the present invention provides a process to optimize both a dose of at least one treatment agent required to modify properties of a fluid being treated in a separation device and a hydraulic retention time of the separation device, the process comprising the steps of:

(a) measuring at least one operation parameter of the separation device to obtain at least one measured operational parameter;

(b) calculating an optimal dose for the at least one treatment agent based on the at least one measured operational parameter to obtain a determined optimal dose;

(c) determining the optimal hydraulic retention time based on the at least one measured operational parameter to obtain a determined optimal hydraulic retention time;

(d) adjusting the dose of the at least one treatment agent to the determined optimal dose; and (e) adjusting the hydraulic retention time of the separation device to the determined optimal hydraulic retention time In another of its aspects, the present invention provides a system for modulating a dose of at least one treatment agent required to modify properties of a fluid to optimize the performance of a separation process, the system comprising:

(a) a separation device including at least one fluid inlet and at least one fluid outlet;

(b) at least one injection point for the addition of at least one treatment agent to a stream of the fluid;

(c) a controller configured to modulate the dose of the at least one treatment agent to the stream of the fluid; and (d) a programmable logic device configured to determine the dose of at least one treatment agent based on at least one operational parameter of the separation device, the programmable logic device outputting a determined dose for the at least one treatment agent to the controller which in response adjusts the dose of the treatment agent at the at least one injection point to the determined dose.

In another of its aspects, the present invention provides a system for adjusting the dose range of a treatment agent required to modify the properties of a fluid to optimize the performance of a separation device, the system comprising:

(a) a separation device including at least one fluid inlet and at least one fluid outlet;

(b) at least one injection point for the addition of at least one treatment agent to a stream of the fluid;

(c) a controller configured to modulate the dose of the at least one treatment agent to the stream of the fluid; and (d) a programmable logic device configured to determine the dose of at least one treatment agent based on at least one operational parameter of the separation device, the programmable logic device outputting a determined dose for at least one treatment agent to the controller which in response adjusts the dose rate of the treatment agent at the at least one injection point to the determined dose.

In another of its aspects, the present invention provides a system for modulate a dose range of a treatment agent required to modify properties of a fluid of a separation system and to modulate a hydraulic retention time of the separation system to optimize the performance of the separation device, the system comprising:

(a) a separation device including at least one fluid inlet, and at least one fluid outlet.

(b) at least one injection point for the addition of at least one treatment agent to a stream of the fluid;

(c) a first controller configured to modulate the dose of the at least one treatment agent to the stream of the fluid;

(d) a second controller configured to modulate an operational parameter of the separation system to modify the hydraulic retention time; and (e) a programmable logic device configured to determine the dose of at least one treatment agent and the hydraulic retention time of the separation system of based on at least one operational parameter of the separation device; the programmable logic device outputting the determined dose for the at least one treatment agent and the hydraulic retention time to the controller which in response adjusts the dose rate of the treatment agent at the at least one injection point to the determined dose.

In another of its aspects, the present invention provides a system for adjusting at least one operational parameter of a pretreatment or post-treatment system based on at least one operational parameters of a separation device, the system comprising;

(a) a separation device including at least one fluid inlet and at least one fluid outlet;

(b) a first controller in communication with the separation device;

(c) a second controller in communication with the pretreatment or post-treatment system;

(d) programmable logic device configured to determine (e.g., calculate) a required adjustment of the pretreatment or post treatment system based on at least one operational parameter of the separation device, the programmable logic device outputting a determined value of the at least one operational parameter of a pretreatment or post-treatment system, the programmable logic device in communication with the second controller, the second controller configured to adjust the at least one operational parameter of the pretreatment or post-treatment system to the determined value.

Thus, the present inventors have developed a system and process for optimizing and controlling upstream fluid treatment processes using information on fluid characteristics obtained from response variables of a separation device (such as the belt speed or water level of an RBF—see FIGS. 1-2 for an example of such a separate device). This system and process method allow for the upstream or downstream treatment processes to be adjusted and optimized against the instantaneous operating conditions of the separation device such that both the pre-treatment and post-treatment processes and the separation system always run at an optimal efficiency.

Additionally, since the information obtained from the response variables of the separation device truly reflect the fluid characteristics at the point where the separation system is installed, the same can be used to control a downstream process (for example, the amount of oxygen required in the biological oxidation stage or the sludge retention time in an side stream sludge treatment process such as fermentation or anaerobic digestion).

BRIEF DESCRIPTION OF THE DRAWINGS

Embodiments of the present invention will be described with reference to the accompanying drawings, wherein like reference numerals denote like parts, and in which.

DETAILED DESCRIPTION OF THE PREFERRED EMBODIMENTS

Figure 1:
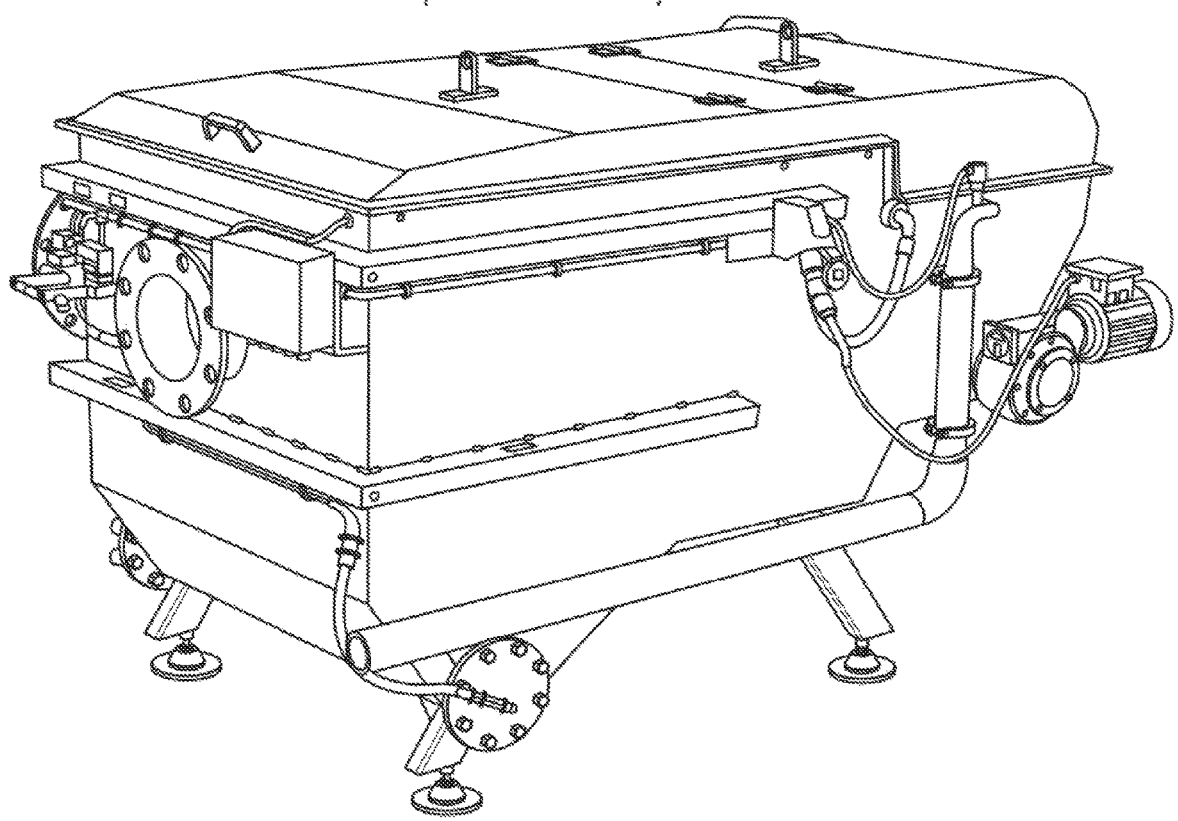
FIG. 1 is a perspective view of a Rotary Belt Filter (RBF)
Figure 2:
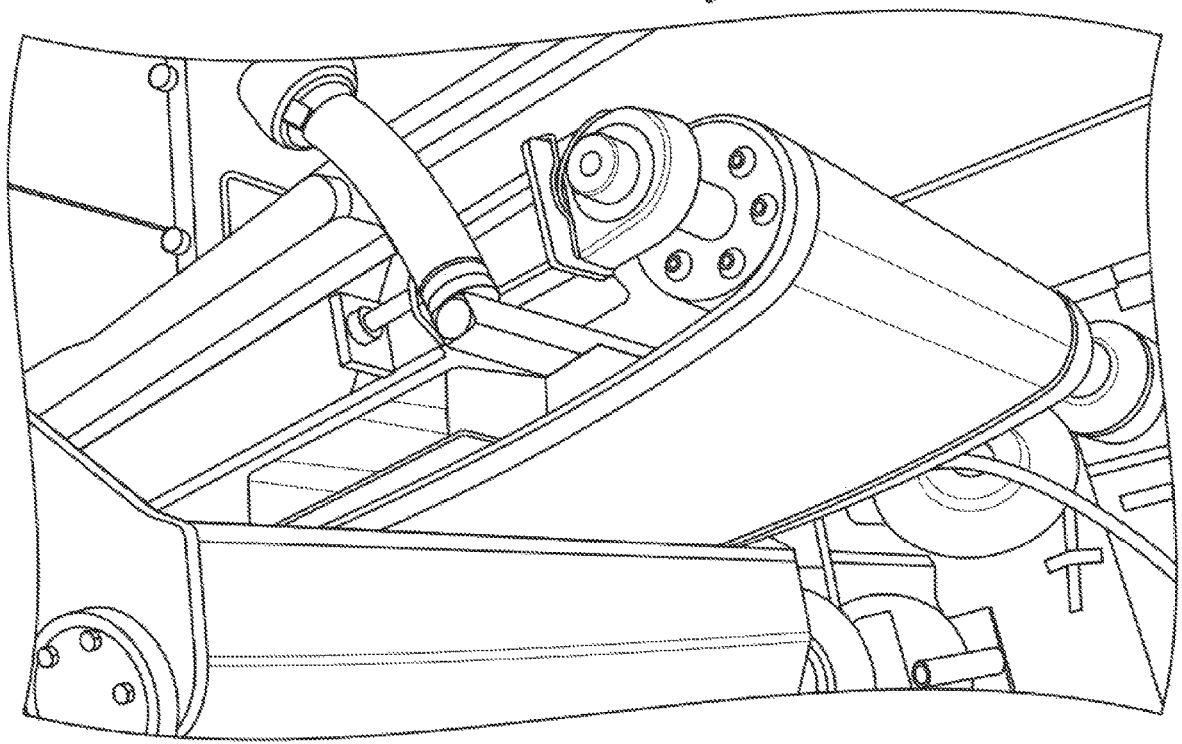
FIG. 2 is a detail view of the continuous belt arrangement in a RBF.

In one of its aspects, the present invention relates to process for optimizing a dose of at least one treatment agent required to modify properties of a fluid being treated in a separation device, the process comprising the steps of:

(a) measuring at least one operational parameter of the separation device to obtain at least one measured operational parameter;

(b) determining an optimal dose for the at least one treatment agent based on the at least one more measured operational parameter to obtain a determined optimal dose; and (c) adjusting the dose of the at least one treatment agent to the determined optimal dose.

In another of its aspects, the present invention relates to process to optimize both a dose of at least one treatment agent required to modify properties of a fluid being treated in a separation device and a hydraulic retention time of the separation device, the process comprising the steps of:

(a) measuring at least one operation parameter of the separation device to obtain at least one measured operational parameter;

(b) calculating an optimal dose for the at least one treatment agent based on the at least one measured operational parameter to obtain a determined optimal dose;

(c) determining the optimal hydraulic retention time based on the at least one measured operational parameter to obtain a determined optimal hydraulic retention time;

(d) adjusting the dose of the at least one treatment agent to the determined optimal dose; and (e) adjusting the hydraulic retention time of the separation device to the determined optimal hydraulic retention time In another of its aspects, the present invention relates a system for modulating a dose of at least one treatment agent required to modify the properties of a fluid to optimize the performance of a separation process, the system comprising:

(a) a separation device including at least one fluid inlet and at least one fluid outlet;

(b) at least one injection point for the addition of at least one treatment agent to a stream of the fluid;

(c) a controller configured to modulate the dose of the at least one treatment agent to the stream of the fluid; and (d) a programmable logic device configured to determine the dose of at least one treatment agent based on at least one operational parameter of the separation device, the programmable logic device outputting a determined dose for the at least one treatment agent to the controller which in response adjusts the dose of the treatment agent at the at least one injection point to the determined dose.

In another of its aspects, the present invention provides a system for adjusting the dose range of a treatment agent required to modify the properties of a fluid to optimize the performance of a separation device, the system comprising:

(a) a separation device including at least one fluid inlet and at least one fluid outlet;

(b) at least one injection point for the addition of at least one treatment agent to a stream of the fluid;

(c) a controller configured to modulate the dose of the at least one treatment agent to the stream of the fluid; and (d) a programmable logic device configured to determine the dose of at least one treatment agent based on at least one operational parameter of the separation device, the programmable logic device outputting a determined dose for at least one treatment agent to the controller which in response adjusts the dose rate of the treatment agent at the at least one injection point to the determined dose.

In another of its aspects, the present invention relates to a system for modulate a dose range of a treatment agent required to modify properties of a fluid of a separation system and to modulate a hydraulic retention time of the separation system to optimize the performance of the separation device, the system comprising:

(a) a separation device including at least one fluid inlet, and at least one fluid outlet.

(b) at least one injection point for the addition of at least one treatment agent to a stream of the fluid;

(c) a first controller configured to modulate the dose of the at least one treatment agent to the stream of the fluid;

(d) a second controller configured to modulate an operational parameter of the separation system to modify the hydraulic retention time; and (e) a programmable logic device configured to determine the dose of at least one treatment agent and the hydraulic retention time of the separation system of based on at least one operational parameter of the separation device; the programmable logic device outputting the determined dose for the at least one treatment agent and the hydraulic retention time to the controller which in response adjusts the dose rate of the treatment agent at the at least one injection point to the determined dose.

In another of its aspects, the present invention provides a system for adjusting at least one operational parameter of a pretreatment or post-treatment system based on at least one operational parameters of a separation device, the system comprising;

(a) a separation device including at least one fluid inlet and at least one fluid outlet;

(b) a first controller in communication with the separation device;

(c) a second controller in communication with the pre-treatment or post-treatment system;

(d) programmable logic device configured to determine (e.g., calculate) a required adjustment of the pretreatment or post treatment system based on at least one operational parameter of the separation device, the programmable logic device outputting a determined value of the at least one operational parameter of a pretreatment or post-treatment system, the programmable logic device in communication with the second controller, the second controller configured to adjust the at least one operational parameter of the pretreatment or post-treatment system to the determined value.

Preferred embodiments of this these above aspects of the invention may include any one or a combination of any two or more of any of the following features:

- the separation device is a continuous or rotating belt filter;
- the at least one measured operational parameter is the speed of the continuous or rotating filter belt;
- the at least one measured operational parameter is the hydraulic head of the filter;
- the at least one measured operational parameter comprise both the continuous or rotating filter belt and the hydraulic head of the separation device;
- Step (e) comprises adjusting a system parameter of the separation device;
- the system parameter comprises belt speed, water level, flowrate, belt angle, mesh size, mesh material and any combination of two or more of these;
- the hydraulic retention time of the separation device is adjustable;
- the controller is further configured to modify the hydraulic retention time of the separation device by adjusting a system parameter of the separation device;
- the system parameter comprises belt speed, water level, flowrate, belt angle, mesh size, mesh material and any combination of two or more of these;
- the separation device is at least one of a continuous or rotary belt filter, rotary drum filter, centrifuge, gravity belt filter, filter press, membrane filter or any combination thereof;
- a plurality of separation devices are installed in parallel;
- a plurality of separation devices are installed in series;
- the programmable logic device agglomerates operational information from each separation device and is configured to modulate dose rate, flow rate or a combination of both to each separation device;
- the at least injection point is disposed upstream of the at least one fluid inlet;
- the at least injection point is disposed in close proximity to the at least one fluid inlet;
- a mixing device is interposed between the at least one injection point and the at least one fluid inlet;
- the treatment agent is a biological, physical or chemical compound or combination thereof;
- the treatment agent is selected from the group consisting of sludge, biosolids, yeast, micro-organisms, bio-polymers, algae, soil, humic substances, carboxymethyl Cellulose (CMC), recycle streams, coagulants, polymers, metal salts, acids, bases, clay, bentonite, diatomaceous earth, gases, lime, fibers, charcoal, activated carbon, natural coagulants or any combination of two or more thereof;
- the treatment agent is an acrylamide polymer;
- the treatment agent is a flotation agent;
- the fluid to be treated is a vapour;
- the fluid to be treated is a liquid (e.g., a solution, a slurry, a colloidal suspension and the like);
- the fluid is an aqueous liquid;
- the fluid is selected from the group consisting of groundwater, leachate, wastewater, waste activated sludge, sewer water, blackwater, graywater, bilge water, ballast water, feed water, process water, industrial water, irrigation water, recreational water, pond water, lake water, creek water, river water, rain water, runoff water, pool water, cooling water, non-potable water, potable water, drinking water, semi-pure water, spent ultrapure water and any mixture of two or more of these;
- the separation device has two or more fluid inlets;
- one of the fluid inlets is configured to receive a recycled stream from the separation device;
- one of the fluid inlets is configured to receive a recycled stream downstream of the separation process;
- at least one fluid inlet is configured to receive a sludge stream;
- the at least one fluid inlet is configured to receive a recovered treatment agent;
- the treatment agent is recovered in the separation device;
- the programmable logic device is configured to calculate the dose of the treatment agent separately for each fluid inlet;
- the positions of the one or more fluid inlets with respect to the separation device is selected to optimize the performance of the separation device;
- one or more baffles are used to direct the one or more fluid inlets to the separation device to optimize the performance of the separation device;
- the system further comprises a control system configured to modify the operational parameters of the separation device, the control system being independent form the controller;
- the control system further comprises a control system configured to modify the operational parameters of the separation device;
- the programmable logic device is configured to calculate the dose of the treatment agent based on one or more operational parameters provided to the programmable logic controller by the control system;
- the controller is configured to module the dose of the treatment agent and the hydraulic retention of the separation system based on the one or more operational parameters provided to the programmable logic controller;
- the at least one operational parameter is selected from the group consisting of water quality parameters, process parameters, system parameters and any combination thereof;
- the system parameter is selected from the group consisting of belt speed, water level, flow rate, belt angle, mesh size, mesh material and any combination thereof;
- the water quality parameters are one or more of residual polymer in the water stream, residual polymer in the sludge stream, solids concentration (TSS), absorbance or scattering spectra, total organic carbon (TOC), turbidity, chemical oxygen demand (COD), particulate, biological oxygen demand BOD, current streaming potential, UV-254 or any combination thereof;

the process parameters are related to pretreatment or post treatment systems;

the programmable logic controller calculates the dose based on the relative change in operational parameters;

the programmable logic controller is configured to determine the dose of the treatment agent and the hydraulic retention of the separation system based on the relative change in operational parameters;

the dose of the treatment agent is determined (e.g., calculated) to maintain one or more of the operation parameters of the system at a pre-determined set point;

the dose of the treatment agent and the hydraulic retention of the separation system are determined (e.g., calculated) to maintain one or more of the operation parameters of the system at a predetermined set point;

the dose of the treatment agent is determined (e.g., calculated) to maintain one or more of the operation parameters of pretreatment or post-treatment processes at a predetermined set point;

the dose of the treatment agent and the hydraulic retention of the separation system are determined (e.g., calculated) to maintain one or more of the operation parameters of pretreatment or post-treatment processes at a predetermined set point;

the dose of the treatment agent is determined (e.g., calculated) to maintain the performance of a downstream filtration process;

the dose of the treatment agent and the hydraulic retention of the separation system are determined (e.g., calculated) to maintain the performance of a downstream filtration process;

performance of the downstream filtration process is measured by one or more of membrane fouling, backwash frequency, backwash pressure, oxygen demand, mean cellular retention time, excess sludge, membrane TSS, membrane effluent turbidity, membrane effluent BOD and any combination of two or more of these;

the dose of the treatment agent is determined (e.g., calculated) to maintain the performance of an upstream separation process;

the dose of the treatment agent and the hydraulic retention of the separation system are determined (e.g., calculated) to maintain the performance of an upstream separation process;

performance of the upstream separation process is measured by the concentration an floc characteristics of nutrient particulates, phosphorous and nitrogen compounds;

the dose of the treatment agent is calculated to maintain a specified filter belt speed, flow rate, hydrostatic head, system pressure, vacuum, cleaning rate, thickening rate, dewatering rate, air supply or any combination of two or more of these;

the dose of the treatment agent and the hydraulic retention of the separation system are determined (e.g., calculated) to maintain a specified filter belt speed, flow rate, hydrostatic head, system pressure, vacuum, cleaning rate, thickening rate, dewatering rate, air supply and any combination of two or more of these;

the dose rate of the treatment agent is determined (e.g., calculated) to maintain a specified solids content in the fluid at the at fluid outlet of the separation device;

the angle of the belt is modulated to maintain a specified belt speed;

the physical characteristics of the separation device are optimized for a specified dose range of the treatment agent the dose range of the treatment agent is 0-100 ppm;

the dose range of the treatment agent is 10-100 ppm;

the dose range of the treatment agent is 0-10 ppm;

the dose range of the treatment agent is 0-3 ppm; and/or inlet and outlet geometry, filter material, filter surface area, the angle of incline of the filter belt, belt speed, the number of layers composing the filter mesh, their material and pore sizes, or any combination thereof are optimized for a specified dose range of one or more treatment agents.

The present inventors have conducted extensive pilot testing monitoring the dynamic response of the RBF system to variation in upstream fluid characteristics and flowrate. The same experiments were repeated by pre-treating the fluid with a chemical agent (i.e., a polymer), with the intent of altering the fluid characteristics and facilitate the filtration process. Results indicated that altering fluid characteristics via pre-treatment is a viable option to increase RBF performance.

However, due to the additional cost and complexity associated with the use of a pre-treatment step before the RBF technology, the need for an advanced control strategy able to optimize the chemical usage in conjunction with RBF performance was also clearly identified.

RBF pilot data were statistically analyzed to determine whether suitable empirical correlations between controlled and uncontrolled variable could be identified. It was found that significant correlation between fluid characteristics (e.g., particulate removal rate, concentration, etc.) and response variables of a filter (e.g., belt speed, energy available to filtration and polymer dose) exist.

As such, the latter information can be used in an advantageous manner to conceive a control philosophy which can be deployed in virtually any treatment scheme employing a RBF (or separation devices) technology to dynamically optimize the RBF system itself as well as the overall process.

Figure 3:
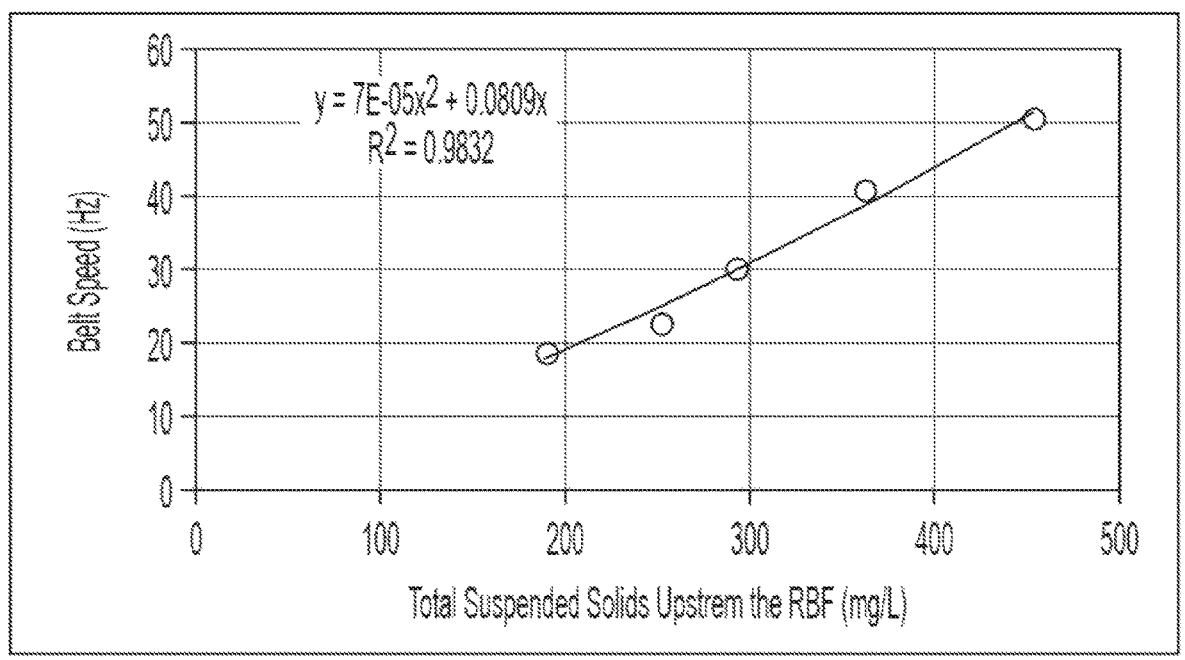
FIG. 3 illustrates the relations hip between total suspended solids and belt speed in a RBF.

FIG. 3 shows a set of experiments conducted where the fluid characteristics (i.e., total suspended solids concentration) was artificially changed during the RBF operation by injecting primary sludge upstream with the intent of verifying whether the response variables of the RBF were able to sense such variation in fluid characteristics. As the RBF system was operated using the current control logic (where the fluid level upstream the system is kept constant), the main variable responding to changes in fluid characteristics was the belt speed. Data illustrated in FIG. 3 clearly confirms that a strong correlation exists between total suspended solids concentration and belt speed. Therefore, the latter can be exploited, in a given water quality, to predict the fluid characteristics once the actual belt speed data are known.

Another set of experiments were conducted by modifying the fluid characteristics upstream the RBF system using a pre-treatment agent (i.e., a polymer). In this case, the pre-treatment step was mostly acting on modifying the particle size distribution by favoring solid agglomeration and particle growth. Even in this case, the RBF system was operated with the current control logic on (i.e., by controlling the fluid level upstream the filter to a desired set-point). Results, summarized in FIG. 4, clearly indicate the presence of a good correlation between polymer dose and belt speed.

Figure 5:
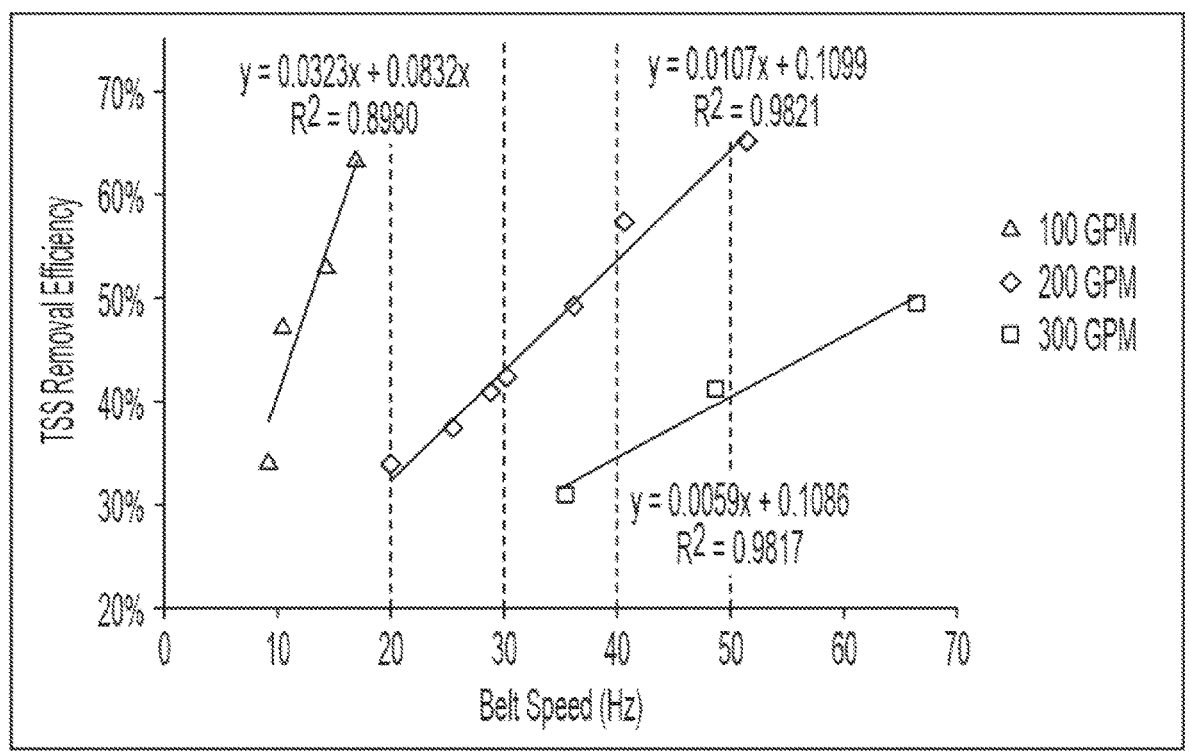
FIG. 5 illustrates the relationship between particulate (Total Suspended Solids) removal efficiency and belt speed in an RBF.

Since a strong correlation between polymer dose and particulate removal efficiency also exists as shown in FIG. 5, the present inventors have a reasonable inference to believe that, using the response variables of a RBF system as inputs to the control logic, the upstream pre-treatment conditions could also be optimized to meet the desired particulate removal efficiency.

Figure 4:
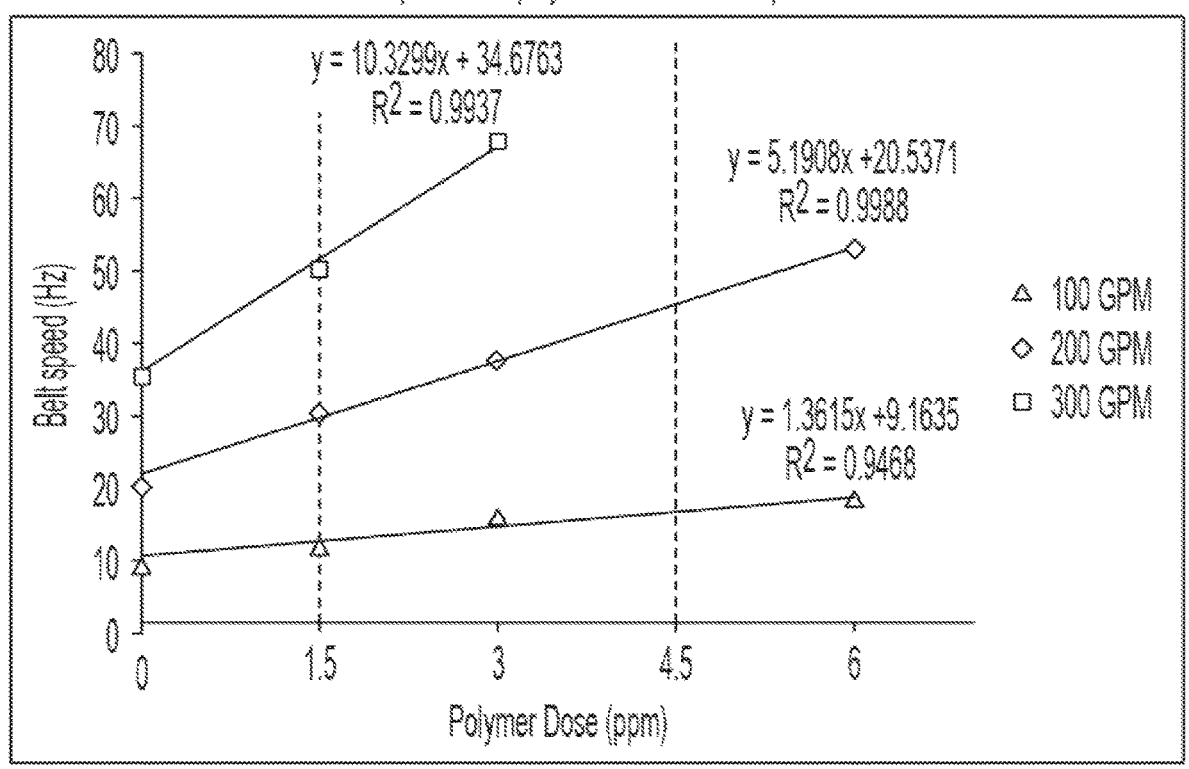
FIG. 4 illustrates the relationship between polymer dose and belt speed in an RBF.

As clearly shown in FIGS. 3-5, the presence of correlations among fluid characteristics, pre-treatment and response variable of a RBF (or similar) leads to advantageous results accruing from the present process and system.

The present process and system for controlling and optimizing RBF upstream and downstream processes is based on the evidence illustrated in the empirical data above can also be defined from a mathematical standpoint.

The variables are defined as follows:
Flowrate (Q),
Fluid characteristics (TSS),
Energy available to the filtration process (H),
Belt speed (S),
Polymer dose (P), and
Particulate removal rate (R).

The particulate removal rate and, more in general, the empirical correlations illustrated in FIGS. 3-5 can be mathematically described in the following form:

$$R = f(Q, TSS, H, P) \qquad \text{Eq.1}$$

It is therefore possible to estimate the extent of pre-treatment, hereby indicated as a polymer dose, rearranging Eq. 1 as follows:

$$P = f(Q, TSS, H, R) \qquad \text{Eq.2}$$

As shown in FIGS. 3 and 4, a relationship among S, TSS, H and R exist, such that:

$$S = f(TSS, H, R) \qquad \text{Eq.3}$$

By substituting Eq. 3 into Eq. 2, the result is Eq. 4:

$$P = f(Q, S) \qquad \text{Eq.4}$$

Eq. 4 is an important relationship behind the control logic, as it indicates that the optimal polymer dose can be identified once the system flowrate and the belt speed are known. If the flowrate Q is fixed, the polymer dose P can be determined directly from the belt speed information. The same reasoning can be extended to RBF system operated at constant mesh speed and variable fluid level H. In that case, the polymer dose P would be estimated by the variation of fluid level H only using Eq. 5:

$$P = f(Q, H) \qquad \text{Eq.5}$$

Other hybrid control logics where the polymer dose P is paced according to both the belt speed S and the fluid level H.

Other hybrid control logics where pre-treatment and/or post-treatment agents and hydraulic retention times are established according to both the belt speed S and the fluid level H information.

The usefulness of the method can also be extended to real-time optimization by recognizing that the response variables of a filter can be collected in a (programmable logic controller) PLC and used in a real-time fashion to feed a control algorithm. In other words, it is possible with an extension of this method to account for the time dependency of Eq. 4 and 5 as indicated in Eq. 6:

$$P = f(S, t) \text{ or } P = f(H, t) \qquad \text{Eq.6}$$

Similarly, hybrid control logics are also possible in this case, using a model equation as the one shown in Eq. 7 where neither the belt speed S and the fluid level H are kept constant.

$$P = f(S, H, t) \qquad \text{Eq.7}$$

Another useful extension of this invention may entail downstream process control and optimization. In summary, the method is not restricted to upstream processes and can be deployed to the optimization of upstream-to-filtration processes, downstream-to-filtration processes, or the filtration process itself.

As mentioned, pre-treatment by polymer constitutes an example of control and optimization of upstream processes. Similarly, controlling the oxygen supply in a biological reactor based on a relationship as the one shown in Eq. 8 is an example of optimization and control of downstream processes:

$$\text{Oxygen Supplied to the Biology} = f(S, H, t) \qquad \text{Eq.8}$$

It is worthwhile to emphasize that also the filtration process itself could be optimized using one or more of the relationships presented above. By means of example only, the case of optimizing the mesh cleaning process or the thickening/dewatering stage by determining the ideal dose P of polymer using Eq. 7. Similarly, the maximum dose polymer dose P can be determined in a way overflow conditions are prevented by an increase in belt speed S (or, alternatively, by adjusting Q and P simultaneously for a fixed belt speed S).

Although rotary belt filters are discussed in detail in this specification it will be apparent to one skilled in the art that other continuous filtration devices such as, but not limited to, rotating drums and other gravity driving filtration devices work on similar principles the advantages of the invention presented here with respect to a rotary belt filter will be similarly advantageous when applied to other continuous filtration systems.

For example, gravity belt thickeners (GBTs) are used to increase the sludge concentration and have an operating principle very close to RBF. GBTs use polymer and other chemical upstream as well, and the same inventive principle could also apply to them. Similarly, centrifuge may rotate faster or slower, and/or absorb more or less current, depending on characteristics of the wastewater quality entering the system. Similarly, this information can be used to control pre-treatment, and post-treatment.

While this invention has been described with reference to illustrative embodiments and examples, the description is not intended to be construed in a limiting sense. Thus, various modifications of the illustrative embodiments, as well as other embodiments of the invention, will be apparent to persons skilled in the art upon reference to this description. It is therefore contemplated that the appended claims will cover any such modifications or embodiments.

All publications, patents and patent applications referred to herein are incorporated by reference in their entirety to the same extent as if each individual publication, patent or patent application was specifically and individually indicated to be incorporated by reference in its entirety.

What is claimed is:

1. A process for optimizing a dose of a treatment agent required to modify properties of a fluid via treatment using a separation device, wherein the separation device separates a particulate from the fluid, the process comprising the steps of:

(a) measuring at least one operational parameter of the separation device;
(b) determining an optimal hydraulic retention time based on another measured operational parameter;
(c) determining an optimal dose for the treatment agent based on the at least one measured operational parameter to obtain a determined dose, wherein the treatment agent is selected from the group consisting of: a polymer and a coagulant, and wherein the determining is based upon a signal from at least one sensor, wherein the at least one sensor measures a characteristic of the fluid selected from the group consisting of a residual polymer concentration, a solids concentration, an absorbance spectra, a scattering spectra, a total organic carbon, a chemical oxygen demand, and a concentration of phosphorous; and
(d) adjusting the dose of the treatment agent to the determined dose and the determined optimal hydraulic retention time of the separation device.

2. The process defined in claim 1, wherein the separation device comprises a continuous or rotating belt filter.

3. The process defined in claim 2, wherein the at least one measured operational parameter is the speed of the continuous or rotating filter belt.

4. The process defined in claim 1, wherein the at least one measured operational parameter is a hydraulic head of a filter of the separation device.

5. The process defined in claim 1, wherein the at least one measured operational parameter comprises a speed of a continuous or rotating filter belt of the separation device, and a hydraulic retention time of the separation device.

6. A process for optimizing a dose of a treatment agent required to modify properties of a fluid via treatment using a separation device, wherein the separation device separates a particulate from the fluid, the process comprising the steps of:
(a) measuring at least one operational parameter of the separation device;
(b) determining an optimal hydraulic retention time based on another measured operational parameter;
(c) determining an optimal dose for the treatment agent based on the at least one measured operational parameter to obtain a determined dose, wherein the at least one operation parameter comprises a flow rate, wherein the treatment agent is selected from the group consisting of: a polymer and a coagulant, and wherein the determining is based upon a signal from at least one sensor, wherein the at least one sensor measures a characteristic of the fluid selected from the group consisting of a residual polymer concentration, a solids concentration, an absorbance spectra, a scattering spectra, a total organic carbon, a chemical oxygen demand, and a concentration of phosphorous; and
(d) adjusting the dose of the treatment agent to the determined dose and the determined optimal hydraulic retention time of the separation device.

* * * * *